June 15, 1965 R. MIGNOT 3,189,373
QUICK-CONNECTION ASSEMBLY FOR METAL STRUCTURES
Filed March 1, 1961 2 Sheets-Sheet 1

INVENTOR
ROLAND MIGNOT
By Irwin S. Thompson
ATTY.

June 15, 1965  R. MIGNOT  3,189,373
QUICK-CONNECTION ASSEMBLY FOR METAL STRUCTURES
Filed March 1, 1961  2 Sheets-Sheet 2
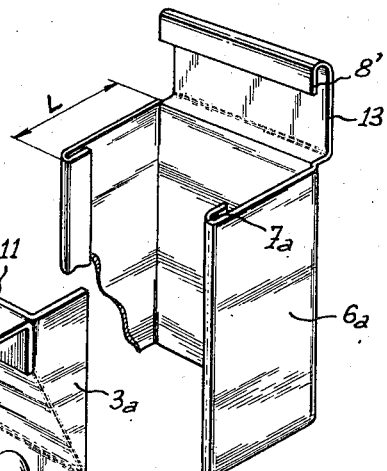
FIG.7
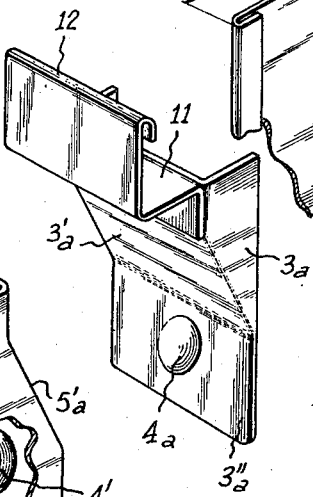
FIG.5
FIG.6
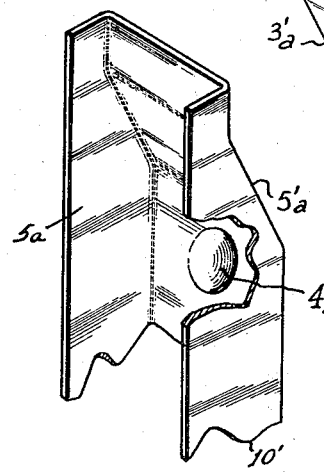
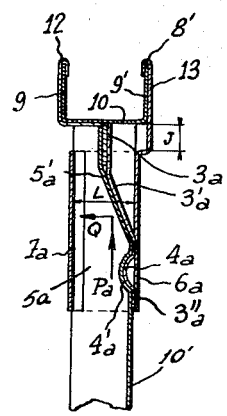
FIG.8
INVENTOR
ROLAND MIGNOT
BY Irwin S. Thompson
ATTY.

United States Patent Office 3,189,373
Patented June 15, 1965

3,189,373
QUICK-CONNECTION ASSEMBLY FOR METAL STRUCTURES
Roland Mignot, Saint-Amour, France,
assignor to F. Fillod F.S.A.
Filed Mar. 1, 1961, Ser. No. 92,633
Claims priority, application France, June 22, 1960,
830,175
2 Claims. (Cl. 287—54)

This invention relates to a joint consisting of components made of steel sections or other material, and for general use in joining structural elements especially of rapidly-assembled structures using prefabricated components.

The object of the invention is to provide a joint which is quickly made and is automatically maintained against any forces, either tension or compression, to which its components may be subjected, by resolving such forces into oblique or transverse components which are taken up by the interlock of the joint components and therefore themselves operate to reinforce such interlock the resistance of which increases in proportion to said forces.

Embodiments of the invention will now be described, by way of example, with reference to the accompanying drawings in which:

FIG. 5 is a perspective view of a joint member for resisting upward stress;

FIG. 6 is a perspective view partially cut away of a joint member forming the upper part of the corresponding vertical element;

FIG. 7 is a perspective view of the corresponding sliding sleeve, and

FIG. 8 is a vertical section of the assembly of the components according to FIGS. 5, 6 and 7.

Figure 1:
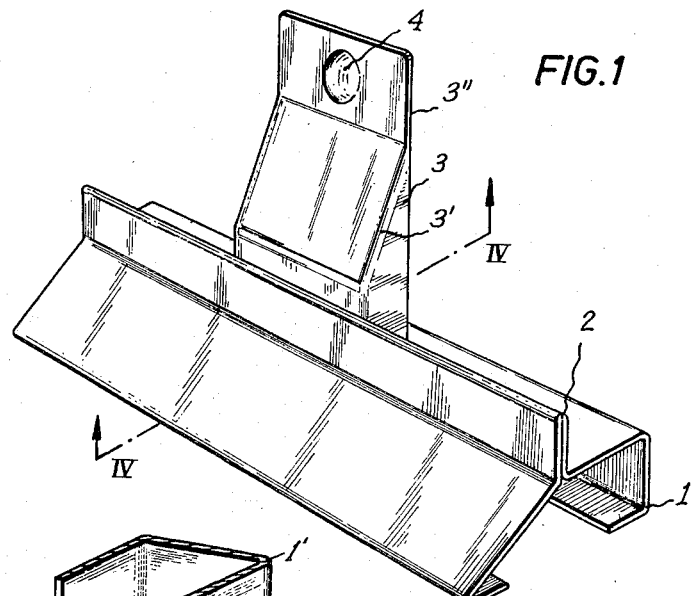
FIG. 1 is a perspective view of a horizontal channel-section joist and its joint member.
Figure 2:
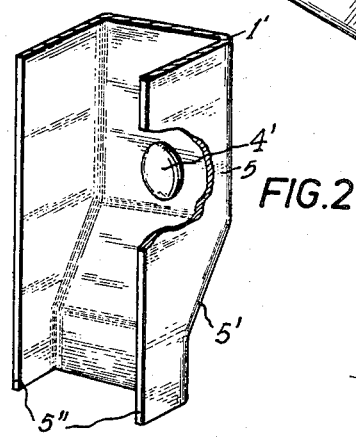
FIG. 2 is a perspective view of the lower part (partially cut away) of the corresponding vertical channel-section joist with an integral joint member.
Figure 3:
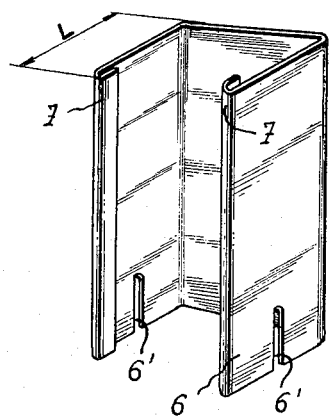
FIG. 3 is a perspective view of the sliding sleeve component of the joint.

With reference first to FIGS. 1 to 4, an example is shown of the attachment of a vertical channel-section joist 1' to a horizontal joist 1. This joist 1 is of a usual channel section ensuring its stiffness, with the novel characteristic that along its upper face it has a bead forming a vertical fin or rib 2 running lengthwise from one end of the joist to the other. To one of the faces of this fin there is secured the base of the lower part of the channel-section joint member 3, said base being continued upwards by a sloped face 3' and then by a top vertical end part 3" having a part-spherical countersink forming a part-spherical face 4. On each of the joint members 3 (only one has been shown) welded at intervals along the length of the joist 1, there is fitted a channel-section joint member 5 integral with the lower part of the vertical element 1' (FIG. 2), the sloped face 5' and the part-spherical face 4' of which correspond exactly with the sloped face 3' and part-spherical face 4 of the member 3 (see FIG. 4). The component members are assembled with their faces interengaging and locking of the components is effected by a sliding sleeve 6 (FIG. 3) of steel channel section with two lower vertical slots 6' fitting over the fin 2 on either side of the stanchion or upright element 1', and with two beads or folds 7 which tightly grip the flanges 5" of the joint member. This sleeve 6 is fitted by being slid down the element 1' and over the component members to be gripped and thus secured, its depth L being such that this sliding can be performed without the application of excessive force but also without leaving an excessive clearance or backlash.

Figure 4:
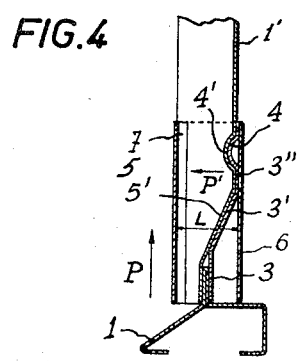
FIG. 4 is a vertical section of the assembled joint components according to FIGS. 1, 2 and 3, along the line IV—IV in FIG. 1.

Inspection of the drawing and in particular of FIG. 4 shows the interaction between the different components of the assembly: a force P acting vertically in tension upwards on the element 1' forming the stanchion in question tends to cause the face 4' to slide over the corresponding face 4: but this force would tend to move horizontally, in the direction of P', the sloped face 5' of the member on element 1', and the flanges 5" of the member would further reinforce the action of the sleeve 6 which would with even greater force press the sloped face 3' and the domed face 4 of the member 3 respectively against the sloped face 5' and the domed face 4'. This interlocking gives an inherently rigid joint, the sloped faces acting simultaneously as a reinforcing strut and as a wedge on account of their inclination.

FIGS. 5 to 8 show a second embodiment of a joint assembly in accordance with the present invention, applied in this case to attaching a vertical channel-section element 10' to an upper horizontal channel-section element 10 with side walls 9 and 9' directed upwards. This element 10 carries on its wall 9 which fits in the hooked or beaded edge 12 of an angle bar 11, the channel-section member 3a to the upper part of which is secured the lower part of the angle bar 11. This member 3a has, as previously, a sloped fact 3'a and a flat end part 3"a with a domed face 4a; but is inverted with reference to the member according to the first embodiment described. As regards the sliding sleeve 6a, it retains the beaded edges 7a which fit over the side walls of the member 5a, but it further has, for its own support, a front panel 13 the upper edge of which is hooked at 8' to engage over the side wall 9' of the element 10. This front panel 13 is slightly stepped outwards from the base of the locking sleeve 6a and there is a clearance J, thus permitting the hooking of the bead 8' over the side wall 9'.

This joint assembly is particularly resistant to compression forces which may act vertically upwards on the element 10'; this force Pa (FIG. 8) is resolved by the supporting action of the sloped face 5'a into a horizontal component Q which merely increases the rigidity of the joint over the width L, since the sleeve 6a is unable to expand. The action of the components is the opposite of that in the first example, but is the exact equivalent thereof.

The invention thus provides a joint for structural elements of steel or other sections, which enables rapid erection of structures. The coacting faces serve as wedge devices which provide for automatic interlocking of the joint components against forces which may act along the elements, either in compression or tension, by resolving such forces into oblique or transverse components which are taken up by the resulting rigidity of the interlocked components.

I claim:

1. A joint comprising a pair of channel members each having a web and a pair of flanges, the channel members being disposed with their webs back to back with the flanges of each channel member extending away from the other channel member, each web comprising a pair of parallel portions lying in planes spaced from each other and an inclined portion interconnecting said parallel portions, said inclined portion of both channel members having substantially the same inclination, said webs nesting with each other, a said parallel portion of each channel member having complementary nesting detent means, at least one of the interengaging surfaces of said detent means merging with its associated said parallel portion on the same side of said detent means as said inclined portion at an acute angle of opposite inclination from said inclined portion thereby to force said inclined portions together, and a sleeve embracing the channel members and so disposed about said members as to cooperate with said interengaging surfaces of said detent means to resist lateral separation of said members occasioned by longitudinal tensile forces tending to separate said members.

2. A joint as claimed in claim 1, and an elongated member extending transversely of said channel members and secured to one of said channel members, said elongated member having an outstanding rib extending lengthwise thereof, the rib being disposed between the said parallel portions of said channel members which are remote from said detent means, the sleeve having a pair of slots on opposite sides thereof in which said rib is disposed.

References Cited by the Examiner

UNITED STATES PATENTS

| 336,783 | 2/86 | Bartholomew | 287—104 |
| 1,146,756 | 7/15 | Foukes | 189—19 |
| 2,204,103 | 6/40 | Lampkin | 287—104 |

CARL W. TOMLIN, *Primary Examiner.*

CORNELIUS D. ANGEL, *Examiner.*